(12) United States Patent
Akou et al.

(10) Patent No.: US 9,914,285 B2
(45) Date of Patent: Mar. 13, 2018

(54) DECORATIVE SHEET AND DECORATIVE RESIN MOLDED ARTICLE OBTAINED USING SAME

(71) Applicant: DAI NIPPON PRINTING CO., LTD., Tokyo (JP)

(72) Inventors: Takayoshi Akou, Tokyo (JP); Nobuo Saitou, Takyo (JP); Emi Harigae, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/140,972

(22) Filed: Apr. 28, 2016

(65) Prior Publication Data

US 2016/0236447 A1    Aug. 18, 2016

Related U.S. Application Data

(62) Division of application No. 14/348,067, filed as application No. PCT/JP2012/056160 on Mar. 9, 2012, now Pat. No. 9,352,611.

(30) Foreign Application Priority Data

Sep. 30, 2011    (JP) .................................. 2011-218388

(51) Int. Cl.
*B32B 25/08*    (2006.01)
*B32B 25/14*    (2006.01)
(Continued)

(52) U.S. Cl.
CPC .............. *B32B 25/08* (2013.01); *B32B 23/08* (2013.01); *B32B 23/20* (2013.01); *B32B 25/14* (2013.01);
(Continued)

(58) Field of Classification Search
None
See application file for complete search history.

(56) References Cited

U.S. PATENT DOCUMENTS

| | | |
|---|---|---|
| 8,597,793 B2 | 12/2013 | Saitou et al. |
| 2007/0154685 A1 | 7/2007 | Ikeda et al. |

(Continued)

FOREIGN PATENT DOCUMENTS

| | | |
|---|---|---|
| EP | 1724120 A1 | 11/2006 |
| JP | 2001-162758 A | 6/2001 |

(Continued)

OTHER PUBLICATIONS

Search Report dated May 20, 2015, for counterpart European Application No. 12836732.3; 5 pages.

(Continued)

*Primary Examiner* — Laura C Powers
(74) *Attorney, Agent, or Firm* — Fitch, Even, Tabin & Flannery, LLP

(57) ABSTRACT

A decorative sheet which comprises, on a base film layer, a second picture layer that is partially provided and a surface protective layer that is present on and in contact with the second picture layer and covers the entire surface of the base film layer including the region where the second picture layer is formed and the region where the second picture layer is not formed. The decorative sheet is characterized in that: a binder resin for a second picture ink that constitutes the second picture layer is a thermoplastic resin; the surface protective layer is formed of a crosslinking-cured product of an ionizing radiation curable resin composition that contains a polycarbonate (meth)acrylate and/or an acrylic silicone (meth)acrylate; and a low gloss pattern layer that has a low luster region is formed in the surface protective layer right above the second picture layer by the interaction between the ionizing radiation curable resin and the thermoplastic (Continued)

resin. A decorative resin molded article which is obtained using the decorative sheet.

1 Claim, 1 Drawing Sheet

(51) Int. Cl.
| | |
|---|---|
| B32B 27/30 | (2006.01) |
| B32B 27/28 | (2006.01) |
| B32B 27/20 | (2006.01) |
| B32B 27/08 | (2006.01) |
| B32B 27/36 | (2006.01) |
| B32B 27/16 | (2006.01) |
| B44F 9/02 | (2006.01) |
| B44F 9/00 | (2006.01) |
| B44C 1/17 | (2006.01) |
| B44C 1/175 | (2006.01) |
| B44F 1/00 | (2006.01) |
| B32B 23/08 | (2006.01) |
| B32B 23/20 | (2006.01) |

(52) U.S. Cl.
CPC ............. *B32B 27/08* (2013.01); *B32B 27/16* (2013.01); *B32B 27/20* (2013.01); *B32B 27/283* (2013.01); *B32B 27/308* (2013.01); *B32B 27/365* (2013.01); *B44C 1/175* (2013.01); *B44C 1/1712* (2013.01); *B44F 1/00* (2013.01); *B44F 9/02* (2013.01); *B32B 2250/02* (2013.01); *B32B 2250/24* (2013.01); *B32B 2255/10* (2013.01); *B32B 2255/26* (2013.01); *B32B 2264/025* (2013.01); *B32B 2264/0264* (2013.01); *B32B 2264/0292* (2013.01); *B32B 2307/408* (2013.01); *B32B 2307/412* (2013.01); *B32B 2307/51* (2013.01); *B32B 2307/584* (2013.01); *B32B 2307/712* (2013.01); *B32B 2307/714* (2013.01); *B32B 2451/00* (2013.01); *B32B 2605/00* (2013.01); *B32B 2605/003* (2013.01); *Y10T 428/24868* (2015.01)

(56) References Cited

U.S. PATENT DOCUMENTS

| | | |
|---|---|---|
| 2010/0009135 A1 | 1/2010 | Hama |
| 2011/0143128 A1 | 6/2011 | Saitou et al. |
| 2011/0171429 A1 | 7/2011 | Huang et al. |

FOREIGN PATENT DOCUMENTS

| | | |
|---|---|---|
| JP | 2007-261259 A | 10/2007 |
| JP | 2008-87269 A | 4/2008 |
| JP | 2008-238601 A | 10/2008 |
| JP | 2009-132145 A | 6/2009 |
| JP | 2010-30277 A | 2/2010 |
| JP | 2010-234769 A | 10/2010 |
| JP | 2011-73373 A | 4/2011 |
| JP | 2011-73380 A | 4/2011 |
| JP | 2011-207187 A | 10/2011 |
| WO | 2008038703 A1 | 4/2008 |
| WO | 2010001867 A1 | 1/2010 |

OTHER PUBLICATIONS

JP 2011-073373, Saito et al., Machine Translation via AIPN website.

JP 2001-162758, Togasaki et al., Machine Translation via AIPN website.

[Fig. 1]
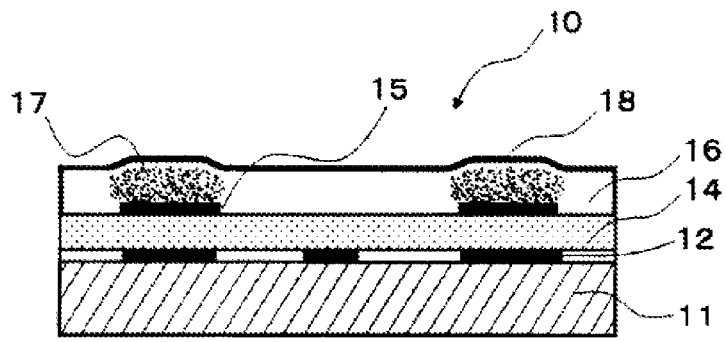
[Fig. 2]
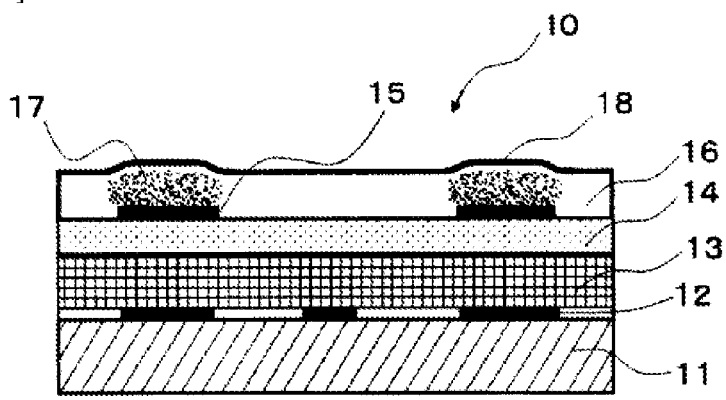
[Fig. 3]
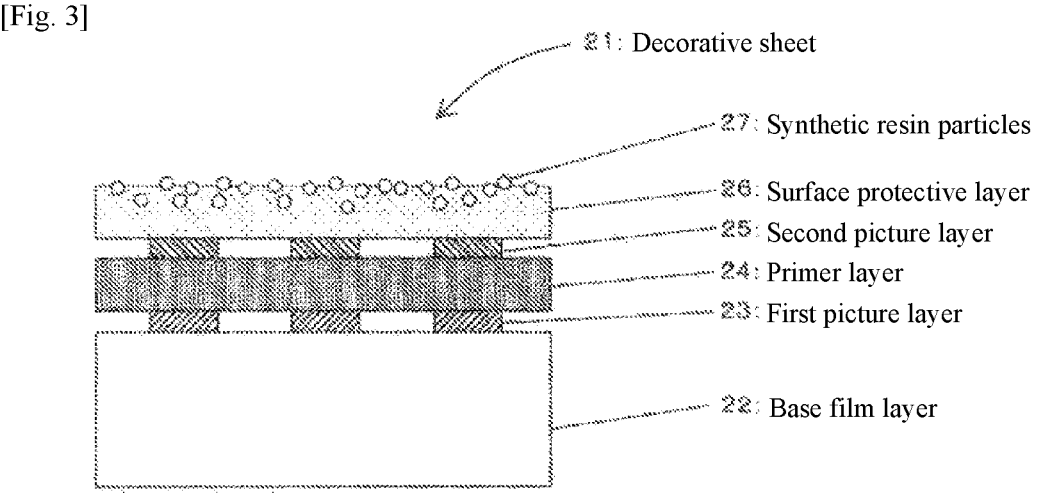

DECORATIVE SHEET AND DECORATIVE RESIN MOLDED ARTICLE OBTAINED USING SAME

CROSS-REFERENCE TO RELATED APPLICATIONS

This application is a division of U.S. application Ser. No. 14/348,067, filed Mar. 28, 2014, which is a which is a U.S. national phase application filed under 35 U.S.C. § 371 of International Application No. PCT/JP2012/056160, filed Mar. 9, 2012, designating the United States, which claims priority from Japanese Application No. 2011-218388, filed Sep. 30, 2011, the contents of each of which are hereby incorporated herein by reference in their entirety for all purposes.

TECHNICAL FIELD

The present invention relates to a decorative sheet and a decorative resin molded article obtained using the same, particularly, a decorative sheet that is rarely change in gloss before and after subjected to decorative molding and that is excellent in scratch resistance, and a decorative resin molded article having such properties.

BACKGROUND ART

Decorative resin molded articles each decorated by laminating a decorative sheet onto the surface of molded articles are used for various products such as vehicle interior parts. Examples of a method for molding such a decorative resin molded article include an insert molding method of shaping a decorative sheet beforehand into a three-dimensional shape by use of a mold for vacuum molding, inserting the shaped sheet into an injection mold, and then injecting a resin in a flowing state into the mold to integrate the resin and the shaped sheet with each other, and an injection molding simultaneous decorating method of integrating a decorative sheet inserted into a mold when injection molding is performed with a melted resin injected into its cavity, so as to apply a decoration onto the surface of the resin molded article.

As described above, a decorative resin molded article obtained by such a molding method is used for vehicle interior parts and other products; thus, the molded article has been desired to have a three-dimensional moldability such that the raw material thereof can sufficiently follow three-dimensional molding, and surface properties such as surface scratch resistance and chemical resistance, and further have a high-class appearance matched with recent customers' demands for high-quality articles. The supply of texture by giving deglossing or irregularities to a resin molded article to be matched with a specific area of its pattern, that is, design property has also been becoming an important theme. For such a theme, suggested are a decorative sheet using, for its surface protective layer, a resin composition containing a predetermined ionizing radiation curable resin and a thermoplastic resin (for example, Patent Document 1), a decorative sheet having a surface protective layer laid to have a predetermined thickness by use of an ionizing radiation curable resin (for example, Patent Document 2), and others. However, about the ionizing radiation curable resins used to form these decorative sheets, importance is attached to three-dimensional moldability of the decorative sheets, so that the resins are insufficient in surface scratch resistance or chemical resistance, or design property in ordinary cases.

PRIOR ART DOCUMENTS

Patent Documents

Patent Document 1: JP 2009-132145 A
Patent Document 2: JP 2010-30277 A

SUMMARY OF INVENTION

Problems to be Solved by the Invention

Under the circumstances, an object of the present invention is to provide: a decorative sheet that is rarely change in gloss before and after subjected to decorative molding and has an excellent three-dimensional moldability, and that gives surface properties such as excellent scratch resistance and chemical resistance, and design property to a decorative resin molded article; and a decorative resin molded article obtained using this decorative sheet.

Means for Solving the Problems

In order to solve the above-mentioned problems, the inventors have repeated eager researches to find out that the problems can be solved by an invention described below. Accordingly, the present invention provides the following decorative sheet and decorative resin molded article using this decorative sheet:

[1] A decorative sheet, including a base film layer, a second picture layer that is laid over a partial area of the base film layer, and a surface protective layer that is present on the second picture layer to contact the second picture layer and further covers the entire surface of its regions including the region where the second picture layer is formed and the region where the second picture layer is not formed, wherein: a binder resin of a second picture ink that forms the second picture layer is a thermoplastic resin; the surface protective layer is a layer obtained by crosslinking and curing an ionizing radiation curable resin composition comprising, as one or more ionizing radiation curable resins, a polycarbonate (meth)acrylate and/or an acrylsilicone (meth)acrylate; and inside the surface protective layer, a low-gloss pattern layer having a low-luster region is formed by an interaction between the ionizing radiation curable resin and the thermoplastic resin just above the second picture layer.

[2] A decorative resin molded article, having at least an injected resin layer, a base film layer, a low-gloss pattern layer, and a surface protective layer in this order; the low-gloss pattern layer being a layer which expresses a low-luster region by an interaction with the surface protective layer; and the surface protective layer comprising a cured product of an ionizing radiation curable resin composition.

Effects of Invention

The present invention makes it possible to provide a decorative sheet that is rarely change in gloss before and after subjected to decorative molding and has an excellent three-dimensional moldability, and that gives surface properties such as excellent scratch resistance and chemical resistance, and design property to a decorative resin molded article, and a decorative resin molded article obtained using this decorative sheet.

BRIEF DESCRIPTION OF DRAWINGS

FIG. 1 is a schematic view illustrating a cross section of an embodiment of the decorative sheet of the present invention.

FIG. 2 is a schematic view illustrating a cross section of an embodiment of the decorative sheet of the present invention.

FIG. 3 is a schematic view illustrating a cross section of an embodiment of the decorative sheet of the present invention.

MODE FOR CARRYING OUT THE INVENTION

[Decorative Sheet]

The decorative sheet of the present invention is a decorative sheet including a base film layer, a second picture layer that is laid over a partial area of the base film layer, and a surface protective layer that is present on the second picture layer to contact the picture layer and further covers the entire surface of its regions including the region where the second picture layer is formed and the region where the second picture layer is not formed, wherein: a binder resin of a second picture ink that forms the second picture layer is a thermoplastic resin; the surface protective layer is a layer obtained by crosslinking and curing an ionizing radiation curable resin composition comprising, as one or more ionizing radiation curable resins, a polycarbonate (meth)acrylate and/or an acrylsilicone (meth)acrylate; and inside the surface protective layer, a low-gloss pattern layer having a low-luster region is formed by an interaction between the ionizing radiation curable resin and the thermoplastic resin just above the second picture layer.

The structure of the decorative sheet of the present invention will be described in detail with reference to FIGS. 1 and 2.

FIGS. 1 and 2 are each a schematic view illustrating a cross section of an embodiment of a decorative sheet 10 of the present invention. In the example illustrated in FIG. 1, a first picture layer 12, a primer layer 14, a second picture layer 15, and a surface protective layer 16 are successively laminated onto a base film layer 11, and the decorative sheet 10 has a low-gloss pattern layer 17 having a low-luster region just above the second picture layer 15. A decorative sheet 10 illustrated in FIG. 2 has a layer structure in which in the same decorative sheet 10 as illustrated in FIG. 1, a transparent resin film layer 13 is further laid between the same first picture layer 12 and primer layer 14. The surface protective layer 16 is formed by crosslinking and curing an ionizing radiation curable resin composition as described above.

<<Base Film Layer>>

The base film layer 11 is selected, considering three-dimensional moldability, compatibility with a resin to be injected, and others, and is typically and preferably a resin film made of a thermoplastic resin. Ordinarily preferably usable examples of the thermoplastic resin include acrylonitrile/butadiene/styrene resin (hereinafter referred to as "ABS resin"), acrylonitrile/styrene/acrylate resin (hereinafter referred to as "ASA resin"), acrylic resin, polyolefin resins such as polypropylene and polyethylene, polycarbonate resin, vinyl chloride resin, and polyethylene terephthalate (PET). Of these resins, ABS resin is preferred from the viewpoint of three-dimensional moldability. The base film layer 11 is usable in the form of a mono-layered sheet made of these resins, or a multi-layered sheet composed of the same resin or different resins.

The bend elastic constant at 25° C. of the base film layer 11 is preferably from 500 to 4,000 MPa, more preferably from 750 to 3,000 MPa. The bend elastic constant is a value measured according to JIS K7171. When the bend elastic constant is 500 MPa or more, the decorative sheet has a sufficient rigidity so that the decorative sheet can obtain excellent surface properties and moldability. When the bend elastic constant is 3,000 MPa or less, in the case of the decorative sheet produced in a roll-to-roll manner, a sufficient tension can be applied to the workpiece of this sheet so that the sheet is not easily slackened, thus its pictures can be printed to be put onto each other without being undesirably shifted, that is, a satisfactory picture registration can be attained.

The thickness of the base film layer 11 is appropriately selected in accordance with a product to which the decorative sheet is used, and is usually from about 50 to 1000 μm, more preferably from 100 to 700 μm, even more preferably from 100 to 500 μm. When the thickness of the base film layer 11 is in this range, the decorative sheet can obtain not only excellent surface properties, three-dimensional moldability and design property but also printing workability (productivity). Thus, this decorative sheet is also favorable in costs.

A surface or both surfaces of the base film layer 11 may be subjected to a physical or chemical surface treatment based on, for example, an oxidation method or irregularity-forming method if desired in order to improve the adhesiveness thereof onto a layer to be laid thereon.

Examples of the oxidation method include corona discharge treatment, chromium oxidation treatment, flame treatment, hot blast treatment, ultraviolet-ozone treatment. Examples of the irregularity-forming method include a sandblasting method, and a solvent treatment method. From these surface treatment methods, an appropriate method is selected in accordance with the kind of the base. Generally, the oxidation method is preferably the corona discharge treatment method from the viewpoint of advantageous effects and the operability thereof and the like.

The base film layer may be subjected to the formation of a primer layer, or some other treatment. Painting may be applied thereto for the adjustment of the color tone thereof, or from the viewpoint of design, a pattern may be beforehand formed therein.

The base film layer 11 may be colored with a colorant from the viewpoint of the color tone adjustment, design or the like, or may not be colored. Thus, the embodiment thereof may be any one of transparent colorless, transparent colored, and semi-transparent embodiments. The colorant used in the base is not particularly limited, and is preferably a colorant that is not discolored even at a high temperature of 150° C. or higher. The colorant may be, for example, an existing dry color, paste color, or master batch resin composition.

<<First Picture Layer>>

The first picture layer 12 is a layer for giving decorativeness to a decorative resin molded article, and is a layer laid if desired. This layer is usually laid on the base film layer 11. According to the first picture layer 12, a pattern that may be of various types may be formed, using an ink by an ordinary printing method, such as gravure printing, offset printing, silk screen printing, printing by transfer from a transferring sheet, or inkjet printing. Examples of the pattern include woodgrain patterns, stone-grain patterns in each of which the surface of rocks or stones is imitated, such as a marble pattern (for example, a travertine marble pattern), fabric patterns in each of which a cloth texture or cloth-like pattern is imitated, tiling patterns, and laid brick patterns. Other examples thereof include mosaic patterns and patchwork patterns, in each of which two or more of the above-mentioned patterns are combined with each other. These patterns are each formed by, for example, multicolor-printing using ordinary yellow, red, blue and black process colors, or color-printing characterized by preparing individual color plates that constitute a pattern.

The ink composition used for the first picture layer 12 may be a composition obtained by blending, appropriately into a binder, a colorant such as a pigment or a dye, an extender pigment, a solvent, a stabilizer, a plasticizer, a catalyst, a curing agent, and others. The binder is not particularly limited. Examples thereof include polyurethane resin, vinyl chloride/vinyl acetate copolymer resin, vinyl chloride/vinyl acetate/acryl copolymer resin, chlorinated polypropylene resin, acrylic resin, polyester resin, polyamide resin, butyral resin, polystyrene resin, nitrocellulose resin, and cellulose acetate resin. One or more selected at will from these resins and other resins are usable alone or in the form of a mixture.

Examples of the colorant include inorganic pigments such as carbon black (Sumi, Japanese ink), iron black, titanium white, antimony white, chrome yellow, titanium yellow, red iron oxide, cadmium red, ultramarine blue, and cobalt blue; organic pigments or dyes such as quinacridone red, isoindolinone yellow, and phthalocyanine blue; metallic pigments each made of scaly foil pieces of aluminum, brass or any other metal; and pearlescent (pearl) pigments each made of scaly foil pieces of titanium dioxide coated mica, basic lead carbonate, or some other substance.

<<Masking Layer>>

In the decorative sheet 10 of the present invention, a masking layer (not illustrated) may be optionally laid between the base film layer 11 and the first picture layer 12. This layer is laid to avoid a matter that the color of the front surface of the base film layer 11 changes or fluctuates to produce an effect onto the color of the picture of the decorative sheet 10. The masking layer is formed by an ordinary printing method such as gravure printing, offset printing, silk screen printing, printing by transfer from a transferring sheet or inkjet printing, or an ordinary coating method such as gravure coating, gravure reverse coating, gravure offset coating, spinner coating, roll coating or reverse roll coating.

Usually, the masking layer is formed into an opaque color in many cases. The so-called solid printed layer having a thickness of about 1 to 20 μm is preferably used. The ink composition that forms the masking layer may be a composition obtained by adopting substances selected appropriately from the same substance as used in the first picture layer 12.

<<Transparent Resin Film Layer>>

The decorative sheet 10 of the invention may preferably have the transparent resin film layer 13 to improve the decorative sheet in chemical resistance. The transparent resin film layer 13 is a layer laid between the base film layer 11 and the second picture layer 15, or laid between the first picture layer 12, which is favorably laid if desired, and the second picture layer 15 or primer layer 14 as illustrated in FIG. 1.

A resin film that forms the transparent resin film layer 13 is appropriately decided, considering the transparency, three-dimensional moldability, shape stability and chemical resistance, and others. A typical preferred example of the resin film is a film of a thermoplastic resin. Ordinary examples of the thermoplastic resin include acrylic resin, polyolefin resins such as polypropylene and polyethylene, polycarbonate resin, acrylonitrile/butadiene/styrene resin (hereinafter referred to as "ABS resin"), polyester resins such as polyethylene terephthalate (PET) and polyethylene naphthalate (PEN), and vinyl chloride resin. Of these resins, preferred are acrylic resin, polyolefin resins, polycarbonate resin, and polyester resins from the viewpoint of scratch resistance and chemical resistance. More preferred are acrylic resin and polyester resin. Even more preferred is polyester resin.

If desired, a surface or both surfaces of the transparent resin film layer 13 may be subjected to a physical or chemical surface treatment based on, for example, an oxidation method or irregularity-forming method in order to improve the adhesiveness thereof onto a layer to be laid thereon. The physical or chemical surface treatment is the same treatment as can be conducted for the base film layer.

The thickness of the transparent resin film layer 13 is not particularly limited, and is preferably from 10 to 200 μm, more preferably from 15 to 150 μm, considering costs, the three-dimensional moldability, shape stability, and others.

<<Primer Layer>>

The decorative sheet 10 of the present invention preferably has the primer layer 14 between the first picture layer 12 and the surface protective layer 16 if desired so that an extended region of the surface protective layer 16 is less likely to be finely cracked or whitened. As illustrated in FIG. 1, the primer layer 14 is preferably laid between the transparent resin film layer 13 which is laid if desired, and the second picture layer 15.

The thickness of the primer layer 14 is preferably 0.1 μm or more. When the thickness is 0.1 μm or more, this layer has an advantageous effect of preventing the surface protective layer from being cracked, broken, whitened or damaged into any other form. When the thickness of the primer layer 14 is 10 μm or less, at the time of painting of the primer layer the painted film is stably dried and cured to be favorably unvaried in three-dimensional moldability. From this viewpoint, the thickness of the primer layer 14 is preferably from 1 to 10 μm.

The fracture elongation of the primer layer 14 is preferably 150% or more, more preferably 200% or more at 120° C. under measuring conditions described below. In a case where the fracture elongation is 150% or more, the extended region of the surface protective layer is not finely cracked or whitened with ease when the decorative sheet is vacuum-molded.

"Measuring Conditions for the Fracture Elongation Measurement"

In accordance with JIS K 7127, 1999, a primer composition constituting the primer layer is crosslinked and cured (by heating at 50° C. for 72 hours) to form, as a sample, a film of 25 mm in width×50 mm in length (between-chuck distance)×40±10 μm in thickness. The sample is put into an oven of 120° C. temperature, and then allowed to stand still for 120 seconds. Thereafter, the fracture elongation thereof is measured at a tension speed of 50 mm/min.

Since the primer layer 14 is laid between the first picture layer 12 and the second picture layer 15, or preferably between the transparent resin film layer 13 and the second picture layer 15 as described above, the primer layer 14 may simultaneously contact the second picture layer 15 and the surface protective layer 16 as illustrated in FIG. 1. Thus, it is preferred to select, as a resin that forms the primer layer 14, a resin having a property of not interacting with the thermoplastic resin forming the second picture layer or the ionizing radiation curable resin forming the surface protective layer, so as not to hinder such a design property effect of the present invention that by an interaction between the binder resin of the second picture ink and the ionizing radiation curable resin constituting the surface protective layer, a low-gloss pattern layer having a low-luster region is formed so that a gloss-difference is generated in the pattern, whereby an unevenness feeling (irregularity feeling) is exhibited to improve the decorative sheet in design property. It is preferred to select, for example, a thermosetting resin.

The primer composition constituting the primer layer 14 is preferably a composition containing, as a binder resin, urethane resin, (meth)acrylic resin, (meth)acryl/urethane copolymer resin, vinyl chloride/vinyl acetate copolymer, polyester resin, butyral resin, chlorinated polypropylene, chlorinated polyethylene, or some other resin. These resins may be used alone or in the form of a mixture of two or more thereof. Of these resins, preferred are urethane resin, (meth) acrylic resin, and (meth)acryl/urethane copolymer resin. In order to make more remarkable the effect of exhibiting the gloss-difference by the second picture layer 15 and the surface protective layer 16, this difference being to be detailed later, it is preferred in the formation of the primer layer 14 to use a crosslinking agent.

The urethane resin may be a polyurethane made from a polyol (polyhydric alcohol) as a main agent, and an isocyanate as a crosslinking agent (curing agent). The polyol used in the invention is a compound having, in the molecule thereof, two or more hydroxyl groups. Usable examples thereof include polyester polyol, polyethylene glycol, polypropylene glycol, acrylic polyol, and polyether polyol. The isocyanate may be a polyvalent isocyanate having, in the molecule thereof, two or more isocyanate groups, for example, an aromatic isocyanate such as 4,4-diphenylmethane diisocyanate, or an aliphatic (or alicyclic) isocyanate such as hexamethylene diisocyanate, isophorone diisocyanate, hydrogenated tolylene diisocyanate, or hydrogenated diphenylmethane diisocyanate. A substance produced by mixing a urethane resin with a butyral resin is also usable.

It is preferred to combine acrylic polyol or polyester polyol as the polyol with hexamethylene diisocyanate or 4,4-diphenylmethane diisocyanate as the crosslinking agent, in particular, combine acrylic polyol with hexamethylene diisocyanate from the viewpoint of the adhesiveness of the crosslinked primer layer onto the surface protective layer 16, difficulty in the generation of an interaction between the primer layer on which the surface protective layer 16 has been laminated, and the layer 16, and physical properties and moldability thereof.

The (meth)acrylic resin may be a homopolymer made from a (meth)acrylate, a copolymer made from two or more different (meth)acrylate monomers, or a copolymer made from a (meth)acrylate and any other monomer. Specific and preferred examples thereof include polymethyl (meth)acrylate, polyethyl (meth)acrylate, polypropyl (meth)acrylate, polybutyl (meth)acrylate, methyl (meth)acrylate/butyl (meth)acrylate copolymer, ethyl (meth)acrylate/butyl (meth) acrylate copolymer, ethylene/methyl (meth)acrylate copolymer, styrene/methyl (meth)acrylate copolymer, and any other (meth)acrylic resin made of a homopolymer or copolymer containing a (meth)acrylate. As used herein, the term "(meth)acryl" refers to acryl or methacryl.

The (meth)acryl/urethane copolymer resin is preferably, for example, acryl/urethane(polyester urethane) block copolymer resin. As the curing agent, various isocyanates as described above are usable. The acryl/urethane(polyester urethane) block copolymer resin is particularly preferred as a resin used for the primer composition since the ratio (ratio by mass) of acryl/urethane components therein is adjusted preferably into the range of 9/1 to 1/9, more preferably 8/2 to 2/8 in accordance with a desire, and this ratio-adjusted resin is usable for various decorative sheets.

<Inorganic Particles>

The primer layer 14 preferably contains inorganic particles in order to make the gloss-difference into a greater degree to improve the decorative sheet in design property. Preferred examples of the inorganic particles include silica, alumina, calcium carbonate, magnesium carbonate, calcium sulfate, barium sulfate, and kaolin particles.

From the viewpoint of an improvement in the design property, the average particle diameter of the inorganic particles is preferably from 0.1 to 5 μm, more preferably from 1 to 5 μm, even more preferably from 2 to 5 μm. The content of the inorganic particles is preferably from 0.01 to 5 parts by mass, more preferably from 0.1 to 1 part by mass for 100 parts by weight of the resin.

The primer layer 14 is formed using a primer composition by an ordinary coating method, such as gravure coating, gravure reverse coating, gravure offset coating, spinner coating, roll coating, reverse roll coating, kiss coating, wheeler coating, dip coating, solid coating using a silk screen, wire bar coating, flow coating, comma coating, overflow coating, brush coating or spray coating, or a transfer coating method. The transfer coating method is a method of forming the primer layer 14 and a painted film of an adhesive layer onto a thin sheet (film base), and then coating a target layer surface in the decorative sheet 10 therewith.

<<Adhesive Layer>>

In the decorative sheet 10 of the invention, an adhesive layer (not illustrated) may be laid onto the rear surface of the decorative sheet 10 (the surface thereof that is opposite to the surface protective layer 16) if desired to improve the sheet in adhesiveness onto an injected resin. For the adhesive layer, in accordance with the injected resin, a thermoplastic resin or thermosetting resin is usable. Examples of the thermoplastic resin include acrylic resin, acryl-modified polyolefin resin, chlorinated polyolefin resin, vinyl chloride/vinyl acetate copolymer, thermoplastic urethane resin, thermoplastic polyester resin, polyamide resin and rubbery resin. These may be used alone or in the form of a mixture of two or more thereof. Examples of the thermosetting resin include urethane resin and epoxy resin.

<<Second Picture Layer>>

The decorative sheet 10 of the invention has the second picture layer 15, which is made of a second picture ink containing a thermoplastic resin as a binder resin. This second picture layer 15 is a layer for forming, inside the surface protective layer 16, the low-gloss pattern layer 17 having the low-luster region just above the picture layer 15 by an interaction between the thermoplastic resin which is the binder resin of the ink forming the second picture layer 15 and the ionizing radiation curable resin forming the surface protective layer 16 which will be detailed later. The second picture layer 15 is a layer laid on a partial area of the base film layer 11, on a partial area of the primer layer 14 as illustrated in FIG. 1, or on a partial area of some other layer. By the formation of the low-gloss pattern layer having the low-luster region (hereinafter referred to also as the patterned ink layer) on the second picture layer 15, a pattern gloss-difference is generated so that the decorative sheet exhibits an unevenness feeling.

A mechanism for the generation of the gloss-difference in the present invention has not yet been sufficiently made clear. However, it appears from various experiments and observations, and measurement results that the following is caused: at the time of painting, onto the front surface of the second picture layer 15, an uncured product of the ionizing radiation curable resin composition for forming the surface protective layer 16, the binder resin of the second picture ink, which forms the second picture layer 15, and the ionizing radiation curable resin exhibit an interaction, such as partial elution-out, dispersion or mixing, by a combination of individual materials thereof or an appropriate selection of conditions for the painting; and by this exhibition, the low-luster region exhibiting a low gloss is formed in an area just above the second picture layer, or a neighborhood thereof that includes the just-above area (hereinafter referred to also as the "just-above area and neighborhood thereof"). This interaction is inevitably generated, and thus the scope of the neighborhood cannot be controlled. This low-gloss pattern layer (patterned ink layer) exhibits a low gloss by the interaction thereof with the ionizing radiation curable resin composition. The exhibition of the design property having the low gloss has no connection with whether or not the low-gloss pattern layer (patterned ink layer) itself is low in gloss.

At the time of the formation of the low-gloss pattern layer, it appears that: the respective resins of the second picture ink and the uncured product of the ionizing radiation curable resin composition turn into a suspension state without turning a completely compatible state in a short period, so as to be present just above the second picture layer 15; and this suspension state region scatters light to constitute the low-luster region. It is presumed that the whole of the low-gloss pattern layer is visually recognized as an uneven pattern for the following reason: the ionizing radiation curable resin composition is crosslinked and cured in the state that the composition continues to have this suspension state, so as to form the surface protective layer; thus, this state is fixed so that the low-gloss pattern layer 17, which has the low-luster region, is partially formed in the surface protective layer; and this partial region comes to be visually recognized as concave portions by visual illusion, and the other region comes to be visually recognized as convex portions. At this time, as the painted amount of the second picture layer 15 becomes relatively larger, the following would be caused: the amount of the second picture layer 15 eluted into the surface protective layer 16 becomes relatively larger so that the degree of the suspension state becomes higher; thus, the luster of the low-gloss pattern layer 17 becomes lower.

The outermost surface of the surface protective layer corresponding to the just-above area, on which the second picture layer is formed, and the neighborhood thereof gains the visual effect of the convexes and concaves even when convex shapes based on the low-gloss pattern layer (patterned ink layer) are not formed; however, physical convex shapes may be formed in the region where the visual effect of the convexes and concaves is gained. In the case of forming the convex shapes, the surface area in which light is scattered is increased by the convex shapes, so that the luster degree is further decreased and further a visual angle permitting the low gloss to be perceivable is also widened. Thus, in cooperation of this effect with the effect of the low-gloss pattern layer (patterned ink layer), the visual unevenness feeling is further emphasized. When the convex shapes are formed, the height of the convex shapes is not particularly limited. Usually, the height is preferably from 2 to 3 µm. This second picture layer may have a picture, or a uniformly even pattern, that is, a solid pattern.

As described above, the low-luster region is formed by an interaction between the binder resin of the second picture ink, and the ionizing radiation curable resin. It is sufficient that the low-gloss pattern layer 17, which has the low-luster region and is formed just above the second picture layer 15, is a layer formed "just above" the second picture layer 15. However, the low-gloss pattern layer 17 may be formed to be extended to a "neighborhood" of the second picture layer 15. The low-gloss pattern layer 17 formed in the "neighborhood" to have the low-luster region is also a layer formed by the interaction between the binder resin of the second picture ink and the ionizing radiation curable resin.

In the present invention, the low-gloss pattern layer 17, which has the low-luster region, is formed by an interaction, such as partial elution-out, dispersion or mixing, between the thermoplastic resin that is a binder resin of the second picture ink forming the second picture layer 15, and the ionizing radiation curable resin forming the surface protective layer 16. Thus, the second picture ink forming the second picture layer 15 needs to be a binder resin having a property capable of exhibiting an interaction between this resin and the ionizing radiation curable resin composition constituting the surface protective layer 16. This binder resin is usually a resin that is used without using a crosslinking agent, such as an isocyanate, together. The binder resin is preferably a thermoplastic resin.

Preferred examples of this thermoplastic resin include acrylic resin, polyester resin, unsaturated polyester resin, polyester urethane resin, nitrocellulose resins such as cellulose nitrate, thermoplastic urethane resin, and polyvinyl acetal resins such as polyvinyl butyral. Of these resins, preferred are acrylic resin, urethane resin, polyester urethane resin, and nitrocellulose resins such as cellulose nitrate because of the compatibility of these resins with a polycarbonate (meth)acrylate and/or acrylsilicone (meth)acrylate adopted as the ionizing radiation curable resin of the ionizing radiation curable resin composition, which constitutes the surface protective layer 16, the two (meth)acrylates being to be detailed later, that is, because of the matter that these preferred resins do not easily cause the two (meth)acrylates to be whitened or damaged into any other form. Particularly preferred is acrylic resin. The weight-average molecular weight of the acrylic resin is preferably 10,000 or more, more preferably 50,000 or more, even more preferably 100,000 or more, still more preferably 150,000 or more, further preferably 200,000 or more.

The weight-average molecular weight of the acrylic resin is preferably 1,000,000 or less, more preferably 700,000 or less, even more preferably 500,000 or less. When the weight-average molecular weight is 10,000 or more, it does not happen that the resin is lowered in thixotropy not to easily exhibit the unevenness feeling of the low-gloss pattern layer. When the weight-average molecular weight is 1,000,000 or less, favorably, the ink-preparation of the second picture ink does not become difficult and further it does not happen at the time of printing the ink that the ink does not easily form a painted film and the ink is unsatisfactorily shifted.

If necessary, in order to adjust the degree of the expression of the low-luster region, or the contrast of the gloss-difference between the low-gloss layer and the surrounding thereof, for example, unsaturated polyester resin, acrylic resin or vinyl chloride/vinyl acetate copolymer may be mixed therewith.

From the viewpoint of an improvement in the design property, it is preferred that the binder resin of the second picture ink is different from that of the ink composition which constitutes the first picture layer 12, and the primer composition in order to make only the second picture layer 15 into a suspension state but to make neither the primer layer 14 nor the first picture layer 12 into a suspension state, considering a relationship of these binder resins with the ionizing radiation curable resin forming the surface protective layer 16. From such a viewpoint, it is particularly preferred to use a crosslinking agent in the primer composition constituting the primer layer 14, as described above. It is preferred to use the above-mentioned thermoplastic resin as the binder resin of the second picture ink, and it is preferred to use no crosslinking agent.

If necessary, for example, an unsaturated polyester resin, an acrylic resin or a vinyl chloride/vinyl acetate copolymer may be mixed therewith in order to adjust the degree of the expression of the low-luster region, and the contrast of the gloss-difference between the low-gloss region and the surrounding thereof.

The second picture ink forming the second picture layer 15 may have a colorant in the same manner as the ink used for the first picture layer 12, so that the second picture ink itself can give a picture pattern. When the decorative sheet of the present invention has the first picture layer 12 as illustrated in FIG. 1, it is not necessarily essential that a colorant is added to the second picture ink composition for forming the second picture layer 15 to color this composition since the color and pattern have already been given to the base film layer 11. In other words, when the decorative sheet has the first picture layer 12, a pattern having visual concave portions based on a gloss-difference is gained by causing the second picture layer 15 to go along with portions which are to be frosted, whereby the portions are desired to be visually expressed as concave portions, inside a pattern that is to be expressed by the first picture layer 12. For example, when a woodgrain pattern is to be expressed by the first picture layer 12, the second picture ink regions of the second picture layer 15 are caused to go along with the capillary tube regions of the woodgrains, thereby producing a pattern in which the capillary tube regions are turned to visually concave portions by a gloss-difference. Alternatively, when a tiling pattern is to be expressed by the first picture layer 12, the second picture ink regions of the second picture layer 15 are caused to go along with joint grooves of the tile veneer, thereby producing a pattern in which the joint grooves are turned to visually concave portions by a gloss-difference.

The painted film thickness of the second picture ink forming the second picture layer 15 is preferably from 0.1 to 10 µm. When the thickness is 0.1 µm or more, the above-mentioned interaction is caused between the second picture ink and the ionizing radiation curable resin composition so that the low-luster region is sufficiently obtained; thus, the front surface of the decorative sheet can obtain a sufficient gloss-difference. When the thickness is 10 µm or less, no mechanical restriction is generated when the second picture ink is printed. Additionally, this case is advantageous in economical efficiency. From these viewpoints, the painted film thickness of the second picture ink more preferably ranges from 0.6 to 7 µm.

In the present invention, by changing the painted amount of the second picture ink forming the second picture layer 15, the decorative sheet can freely obtain, for example, a gradation pattern in which the front surface of the decorative member stepwise changes in gloss-difference or a continuous pattern in which the front surface of the decorative member continuously changes in gloss-difference. For example, the upper portion of the second picture layer 15 (low-gloss pattern layer 17) in the topmost surface of the surface protective layer 16 is bulged by the formation of the second picture layer 15 so that convex shapes 18 can be formed. When the front surface of the surface protective layer 16 has the convex shapes 18 as described herein, these portions scatter light and the front surface area thereof is increased, and the viewing angle permitting the low gloss to be perceived is also widened. Thus, in cooperation of these matters with the effect of the low-gloss pattern layer 17, the visual unevenness feeling is further emphasized. Furthermore, a peculiar design feeling can be obtained such that the portions are visually perceived as concave portions although the portions are physically in a convex form.

<Extender Pigment>

The second picture layer 15 preferably contains extender pigment inorganic particles to cause the generation of a larger gloss-difference to improve the decorative sheet in design property. The extender pigment is not particularly limited, and examples thereof include silica, talc, clay, barium sulfate, barium carbonate, calcium carbonate, and magnesium carbonate. Silica is preferred and finely powdery silica is particularly preferred since silica is high in material design flexibility in oil absorption, particle diameter, pore volume and others, and further the ink thereof gives an excellent design property and is stable paintability.

The oil absorption (according to JIS K 5101-13-1, 2004) of the extender pigment is preferably from 150 to 350 mL/100-g, more preferably from 150 to 300 mL/100-g. When the oil absorption of the extender pigment is 150 mL/100-g or more, the luster value of the surface-protective-layer/second-picture-layer region does not become excessively high so that a difference is increased in gloss between only the surface protective layer region and the surface-protective-layer/second-picture-layer region. Thus, the decorative sheet easily exhibits a high design property. When the oil absorption of the extender pigment is 350 mL/100-g or less, effective use can be made of the performance of lowering the luster value of the surface-protective-layer/second-picture-layer region. Moreover, the second picture layer ink is restrained from rising in thixotropy to attain printing easily with a high design property without being damaged in painting aptitude.

About the content of the extender pigment in the second picture ink forming the second picture layer 15, the ratio by mass (P/V ratio) of the extender pigment to the resin is preferably from 0.2 to 1.5. When the P/V ratio is 0.2 or more, the decorative sheet easily exhibits a high design property. When the ratio is 1.5 or less, the softness of the second picture ink is not damaged so that the surface protective layer is not easily cracked at the time of the molding. From the same viewpoint, the P/V ratio is preferably from 0.2 to 1.2.

In the present invention, the average particle diameter of silica used as the extender pigment in the second picture layer 15 is preferably from 0.1 to 7 µm. When the average particle diameter is 0.1 µm or more, at the time of addition of the silica into the ink the thixotropy of the ink does not become excessively high, and the viscosity of the ink does not become excessively high so that printing therewith is easily controllable. When the deglossing of the capillary tube pattern regions is to be expressed or attained, the thickness of the second picture layer 15 of the capillary tube pattern regions is preferably 7 µm or less; thus, when the average particle diameter of the silica is not more than the thickness of the second picture layer 15, the head-appearance of the particles is relatively restrained not to be conspicuous. Thus, a visually incongruous sense is not easily generated.

<<Surface Protective Layer>>

The surface protective layer 16 is a layer that is present on the second picture layer 15 to contact this layer 15, and is further laid to cover the entire surface of regions including a region where the second picture layer 15 is formed and a region where the second picture layer 15 is not formed. This layer is a layer obtained by crosslinking and curing an ionizing radiation curable resin composition containing, as an ionizing radiation curable resin, a polycarbonate (meth)acrylate and/or an acrylsilicone (meth)acrylate. The surface protective layer 16 is a layer giving the decorative sheet of the present invention an excellent surface property, and expressing the low-gloss pattern layer 17 which has the low-luster region, by the presence of the second picture layer 15, thereby giving an excellent design property thereto.

<Ionizing Radiation Curable Resin Composition>

The ionizing radiation curable resin composition denotes a composition containing an ionizing radiation curable resin. The ionizing radiation curable resin denotes a resin that is crosslinked and cured by irradiation with an ionizing radiation. The ionizing radiation means a wave or beam having energy quanta capable of polymerizing or crosslinking molecules out of electromagnetic waves or charged particle beams. Usually, the ionizing radiation is ultraviolet (UV) rays or an electron beam (EB). Other examples thereof include X-rays, γ rays and other electromagnetic waves; and α ray radiation, an ion beam and other charged particle beams.

In the present invention, the ionizing radiation curable resin may be a polycarbonate (meth)acrylate and/or an acrylsilicone (meth)acrylate. In the invention, the wording "(meth)acrylate" means "acrylate" or "methacrylate". Any wording similar thereto has a meaning similar thereto.

"Polycarbonate (Meth)Acrylate"

The polycarbonate (meth)acrylate used in the present invention is not particularly limited as far as this (meth)acrylate is a compound having, at a polymer main chain thereof, a carbonate bond, and further having, at one or more terminals or side chains thereof, one or more (meth)acrylates. The (meth)acrylate(s) (each) has/have preferably a bi- or higher functionality from the viewpoint of crosslinkability and curability.

This polycarbonate (meth)acrylate is obtained, for example, by converting hydroxyl groups of a polycarbonate polyol partially or wholly into (meth)acrylates (acrylic acid esters or methacrylic acid esters). This esterification reaction can be performed by an ordinary esterification reaction. Examples of a method therefor include a method 1) of condensing a polycarbonate polyol with an acrylic halide or a methacrylic halide in the presence of a base; a method 2) of condensing a poly carbonate polyol with acrylic anhydride or methacrylic anhydride in the presence of a catalyst; and a method 3) of condensing a polycarbonate polyol with acrylic acid or methacrylic acid in the presence of an acid catalyst.

Any one of the above-mentioned polycarbonate polyols is a polymer having, at a polymer main chain thereof, a carbonate bond and further having, at one or more terminals or side chains thereof, two or more, preferably 2 to 50, more preferably 3 to 50 hydroxyl groups. A typical production method of the polycarbonate polyol is a method according to a polycondensation reaction of a diol compound (A), a polyhydric alcohol (B) having three or more hydroxyl groups, and a compound (C) that is to be a carbonyl component with each other.

The diol compound (A) used as one of the raw materials is represented by a general formula of HO—$R_1$—OH wherein $R_1$ is a bivalent hydrocarbon group having 2 to 20 carbon atoms, and may contain therein an ether bond. $R_1$ is, for example, a linear or branched alkylene, cyclohexylene or phenylene group.

Specific examples of the diol compound include ethylene glycol, 1,2-propylene glycol, diethylene glycol, dipropylene glycol, triethylene glycol, polyethylene glycol, neopentyl glycol, 1,3-propanediol, 1,4-butanediol, 1,5-pentaneadiol, 3-methyl-1,5 pentanediol, 1,6-hexanediol, 1,8-octanediol, 1,3-bis(2-hydroxyethoxy)benzene, 1,4-bis(2-hydroxyethoxy)benzene, neopentyl glycol, 1,4-cyclohexanediol, and 1,4-cyclohexanedimethanol. These diols may be used alone or in the form of a mixture of two or more thereof.

Examples of the polyhydric alcohol (B), which has three or more hydroxyl groups, include trimethylolpropane, trimethylolethane, pentaerythritol, ditrimethylolpropane, dipentaerythritol, glycerin, sorbitol, and other alcohols. The polyhydric alcohol (B) may be a hydroxyl-group-having alcohol obtained by adding an alkylene oxide, such as ethylene oxide or propylene oxide, to any one of these polyhydric alcohols in an amount of 1 to 5 equivalents to hydroxyl groups of the alcohol. These polyhydric alcohols may be used alone or in the form of a mixture of two or more thereof.

The compound (C), which is to be a carbonyl component, is any compound selected from carbonic diesters and phosgene, and equivalents thereof. Specific examples thereof include dimethyl carbonate, diethyl carbonate, diisopropyl carbonate, diphenyl carbonate, ethylene carbonate, propylene carbonate, other carbonic diesters, phosgene, and haloformic esters such as methyl chloroformate, ethyl chloroformate, and phenyl chloroformate. These may be used alone or in the form of a mixture of two or more thereof.

The polycarbonate polyol is synthesized by causing the diol compound (A), the polyhydric alcohol (B) which has three or more hydroxyl groups, and the compound (C) which is to be a carbonyl component, to undergo a polycondensation reaction under ordinary conditions. For example, the ratio of the charged mole number of the diol compound (A) to that of the polyhydric alcohol (B) is preferably from 50/50 to 99/1. In connection with the ratio of the charged mole number of the compound (C) which is to be a carbonyl component to that of the diol compound (A) and the polyhydric alcohol (B), the amount of the compound (C) is preferably from 0.2 to 2 equivalents to the hydroxyl groups that the diol compound and the polyhydric alcohol have.

The equivalent number (eq./mol) of the hydroxyl groups present in the polycarbonate polyol after the polycondensation reaction using the above-mentioned ratio between the charged mole numbers is 3 or more, preferably from 3 to 50, more preferably from 3 to 20 per molecule of the polyol on average. When the equivalent number is in this range, the required amount of (meth)acrylate groups are produced by esterification reaction that will be detailed later, and further an appropriate flexibility is given to the polycarbonate (meth)acrylate resin. The terminal functional groups of molecules of this polycarbonate polyol are usually OH groups, and may be partially carbonate groups.

A method for producing the above-mentioned polycarbonate polyol is described in, for example, JP 64-1726 A. The polycarbonate polyol may also be produced by interesterification reaction between a polycarbonate diol and a polyhydric alcohol having three or more hydroxyl groups as described in JP 3-181517 A.

The molecular weight of the polycarbonate (meth)acrylate used in the present invention is measured by GPC analysis, and the weight-average molecular weight thereof in terms of that of standard polystyrene is preferably 500 or more, more preferably 1,000 or more, even more preferably more than 2,000. The upper limit of the weight-average molecular weight of the polycarbonate (meth)acrylate is not particularly limited, and is preferably 100,000 or less, more preferably 50,000 or less to control this resin not to have an excessively high viscosity. The weight-average molecular weight is even more preferably more than 2,000 and not more than 50,000, in particular preferably from 5,000 to 20,000 to make the decorative sheet have both of scratch resistance and three-dimensional moldability.

"Acrylsilicone (Meth)Acrylate"

The acrylsilicone (meth)acrylate used in the present invention is not particularly limited, and may be any compound as far as the compound has, in a single molecule thereof, an acrylic resin structure substituted partially with siloxane bonds (Si—O) and further having, at one or more side chains and/or main chain terminals thereof, two or more (meth)acryloyloxy groups (acryloyloxy groups or methacryloyloxy groups) as functional groups. Preferred examples of the acrylsilicone (meth)acrylate include an acrylic resin structure having, at side chains thereof, siloxane bonds, as disclosed in JP 2007-070544 A.

The acrylsilicone (meth)acrylate used in the present invention can be synthesized, for example, by radical-copolymerizing a silicone macromonomer with a (meth)acrylate monomer in the presence of a radical polymerization initiator.

Examples of the (meth)acrylate monomer include methyl (meth)acrylate, ethyl (meth)acrylate, propyl (meth)acrylate, butyl (meth)acrylate, 2-ethylhexyl (meth)acrylate, and glycidyl (meth)acrylate. These (meth)acrylate monomers may be used alone or in any combination of two or more thereof.

The silicone macromonomer is synthesized, for example, by using n-butyllithium or lithium silanolate as a polymerization initiator to cause a hexaalkylcyclotrisiloxane to undergo living anion polymerization, and further capping the resultant polymer with a silane containing a radical-polymerizable unsaturated group. The silicone macromonomer is preferably a compound represented by the following formula (1):

[Chemical formula 1]

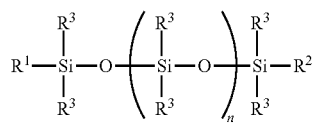
(1)

In the formula (1), $R^1$ represents an alkyl group having 1 to 4 carbon atoms, and is preferably a methyl or n-butyl group. $R^2$ represents a monovalent organic group, and is preferably —CH=CH$_2$, —C$_6$H$_4$—CH=CH$_2$, —(CH$_2$)$_3$O(CO)CH=CH$_2$ or —(CH$_2$)$_3$O(CO)C(CH$_3$)=CH$_2$. $R^3$s may be the same or different, and each represent a hydrocarbon group having 1 to 6 carbon atoms, and is preferably an alkyl group having 1 to 4 carbon atoms or a phenyl group, more preferably a methyl group. The numerical value of n is not particularly limited. For example, the number-average molecular weight of the silicone macromonomer is preferably from 1,000 to 30,000, more preferably from 1,000 to 20,000.

The acrylsilicone (meth)acrylate obtained using the above-mentioned raw materials has, for example, a structural unit represented by any one of the following formulae (2), (3) and (4):

[Chemical formula 2]

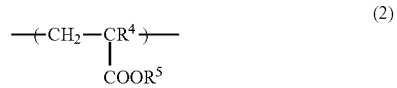
(2)

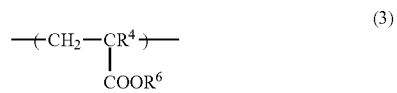
(3)

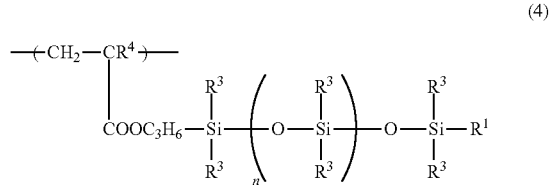
(4)

In any one of the formulae (2), (3) and (4), $R^1$ and $R^3$s have the same meanings as in the formula (1). $R^4$ represents a hydrogen atom or a methyl group. $R^5$ represents the same alkyl group as in any one of the above-mentioned (meth)acrylate monomers; a glycidyl group; or an alkyl group that may have a functional group, such as the same alkyl group as in any one of the above-mentioned (meth)acrylate monomers, or a glycidyl group. $R^6$ represents an organic group having a (meth)acryloyloxy group.

About the acrylsilicone (meth)acrylate, a single species thereof may be used alone, or two species thereof may be used in combination.

The molecular weight of the acrylsilicone (meth)acrylate is measured by GPC analysis, and the weight-average molecular weight thereof in terms of that of standard polystyrene is preferably 1,000 or more, more preferably 2,000 or more. The upper limit of the weight-average molecular weight of the acrylsilicone (meth)acrylate is not particularly limited, and is preferably 150,000 or less, more preferably 100,000 or less to control this resin not to have an excessively high viscosity. The weight-average molecular weight is preferably from 1,000 to 150,000, in particular preferably from 2,000 to 100,000 to make the decorative sheet keep a satisfactory balance among three-dimensional moldability, chemical resistance and scratch resistance.

The average molecular weight between crosslinking points of the acrylsilicone (meth)acrylate is preferably from 100 to 2,500. When the average molecular weight between the crosslinking points is 100 or more, this polymer is preferred from the viewpoint of three-dimensional moldability. When the average molecular weight is 2,500 or less, the polymer is preferred from the viewpoint of chemical resistance and scratch resistance. From the same viewpoints, the average molecular weight of the acrylsilicone (meth)acrylate between its crosslinking points is more preferably from 100 to 1,500, more preferably from 100 to 1,000.

In the ionizing radiation curable resin composition in the present invention, the polycarbonate (meth)acrylate and the acrylsilicone (meth)acrylate may each be used alone, or may be used together with each other.

"Polyfunctional (Meth)Acrylate"

The ionizing radiation curable resin composition used in the present invention may contain a polyfunctional (meth)acrylate. The polyfunctional (meth)acrylate in the invention is not particularly limited as far as the (meth)acrylate is a (meth)acrylate having a bi- or higher functionality. The (meth)acrylate is preferably a (meth)acrylate having a tri- or higher functionality from the viewpoint of curability. The bi-functionality denotes that a compound has in the molecule thereof two (meth)acryloyl groups, which are ethylenically unsaturated bonds.

The polyfunctional (meth)acrylate may be any one of oligomers and monomers thereof and is preferably a polyfunctional (meth)acrylate oligomer from the viewpoint of an improvement of the decorative sheet in three-dimensional moldability.

Preferred examples of the polyfunctional (meth)acrylate oligomer include epoxy (meth)acrylate type, urethane (meth)acrylate type, polyester (meth)acrylate type, and polyether (meth)acrylate type oligomers.

Other examples of the polyfunctional (meth)acrylate oligomer include highly hydrophobic polybutadiene (meth)acrylate oligomers, in each of which a polybutadiene oligomer has at side chains thereof (meth)acrylate groups, silicone (meth)acrylate oligomers, each of which has at a main chain thereof polysiloxane bonds, and aminoplast resin (meth)acrylate oligomers, each of which is obtained by modifying an aminoplast resin, having in a small molecule thereof many reactive groups. The following is usable together with the polyfunctional (meth)acrylate oligomer: for example, novolak type epoxy resin, bisphenol type epoxy resin, or an oligomer having in the molecule thereof a cation-polymerizable functional group, such as aliphatic vinyl ether, or aromatic vinyl ether.

The weight-average molecular weight of these oligomers is preferably from 1,000 to 20,000, more preferably from 1,000 to 10,000.

Examples of the above-mentioned polyfunctional (meth)acrylate monomer include trimethylolpropane tri(meth)acrylate, ethylene-oxide-modified trimethylolpropane tri(meth)acrylate, dipentaerythritol tri(meth)acrylate, propionic-acid-modified dipentaerythritol tri(meth)acrylate, pentaerythritol tri(meth)acrylate, propylene-oxide-modified trimethylolpropane tri(meth)acrylate, tris(acryloxyethyl) isocyanurate, propionic-acid-modified dipentaerythritol penta(meth)acrylate, dipentaerythritol hexa(meth)acrylate, ethylene-oxide-modified dipentaerythritol hexa(meth)acrylate, and caprolactone-modified dipentaerythritol hexa(meth)acrylate. These polyfunctional (meth)acrylates may be used alone or in any combination of two or more thereof.

In connection with the content by percentage of the polyfunctional (meth)acrylate in the present invention, the ratio by mass of the polycarbonate (meth)acrylate or acrylsilicone (meth)acrylate to the polyfunctional (meth)acrylate is preferably from 98:2 to 60:40. When this ratio by mass is smaller than 98:2 (that is, the content by percentage of the polycarbonate (meth)acrylate or acrylsilicone (meth)acrylate is 98% or less by mass), the decorative sheet is not lowered in scratch resistance. When the ratio by mass of the polycarbonate (meth)acrylate or acrylsilicone (meth)acrylate to the polyfunctional (meth)acrylate is larger than 60:40 (that is, the content by percentage of the polycarbonate (meth)acrylate or acrylsilicone (meth)acrylate is 60% or more by mass), the decorative sheet is not lowered in three-dimensional moldability. The ratio by mass of the polycarbonate (meth)acrylate or acrylsilicone (meth)acrylate to the polyfunctional (meth)acrylate is preferably from 95:5 to 65:35, more preferably from 90:10 to 65:35.

A monofunctional (meth)acrylate is appropriately usable together with the polyfunctional (meth)acrylate and so on in the present invention to attain a fall in the viscosity thereof, and some other purpose as far as the object of the invention is not damaged. About the monofunctional (meth)acrylate, a single species thereof may be used alone, or two or more species thereof may be used in combination.

In the case of using, as the ionizing radiation curable resin composition, an ultraviolet curable resin composition, it is desired to add an initiator for photopolymerization in an amount of about 0.1 to 5 parts by mass for 100 parts by mass of its ultraviolet curable resin. The initiator for photopolymerization is not particularly limited, and is appropriately selectable from conventionally used initiators.

In the present invention, it is preferred to use, as the ionizing radiation curable resin composition, an electron beam curable resin composition. The electron beam curable resin composition can be made into a solvent-free type to be more favorable from the viewpoint of the environment and health. Additionally, the composition requires no initiator for photopolymerization, and can gain a stable curability.

Various additives can be blended into the ionizing radiation curable resin composition constituting the surface protective layer in the present invention in accordance with desired physical properties of the resultant cured resin layer. Examples of the additives include weather resistance improvers such as an ultraviolet absorbent and a light stabilizer, an abrasion resistance improver, a polymerization inhibitor, a crosslinking agent, an infrared absorbent, an antistatic agent, an adhesion improver, a levelling agent, a thixotropy supplier, a coupling agent, a plasticizer, an antifoamer, a filler, a solvent, a colorant, and a deglossing agent. These additives may each be one selected appropriately from conventionally used additives.

It is also allowable to use, as an ultraviolet absorbent or light stabilizer, a reactive ultraviolet absorbent or light stabilizer having in the molecule thereof a polymerizable group such as a (meth)acryloyl group. It may be used to be copolymerized therewith to such a degree that the performances (the scratch resistance and the three-dimensional moldability) of the polymer in the present invention, for the surface protective layer, are not damaged.

"Formation of the Surface Protective Layer"

The surface protective layer 16 can be formed by preparing a coating solution containing the above-mentioned ionizing radiation curable resin composition, painting this solution, and crosslinking and curing the painted solution. The viscosity of the coating solution is not particularly limited as far as the viscosity is a viscosity permitting an uncured layer of the resin to be formed onto a surface of a base by a coating method that will be described below.

In the present invention, the uncured resin layer is formed by painting the prepared coating solution over the base film layer 11 on which either one of the second picture layers 15 is formed, the first picture layer 12, and the transparent resin film layer 13 or primer layer 14 by a known method such as gravure coating, bar coating, roll coating, reverse roll coating or comma coating, preferably gravure coating in such a manner that the painted solution will give a thickness of 1 to 1000 μm after cured.

In the present invention, the thus formed uncured resin layer is irradiated with an ionizing radiation, such as an electron beam or ultraviolet rays, so as to be cured, thereby forming the surface protective layer 16. When the electron beam is used as the ionizing radiation in this case, the acceleration voltage thereof is appropriately selectable in accordance with the used resin and the thickness of the layer. It is usually preferred to cure the uncured resin layer at an acceleration voltage of about 70 to 300 kV.

In the radiation of the electron beam, the penetration power thereof is increased as the acceleration voltage is higher. Thus, in the case of using, for the base film layer 11, a base that is to be deteriorated by the electron beam, the acceleration voltage is selected to make the penetration depth of the electron beam substantially equal to the thickness of the resin layer. The selection makes it possible to restrain an extra radiation of the electron beam onto the base film layer 11 so that a deterioration of the base by an excess of the electron beam can be controlled into a minimum level.

The irradiation dose is preferably such a quantity that the crosslinking density of the resin layer is saturated, and is selected usually in the range of 5 to 300 kGy (0.5 to 30 Mrad), preferably in that of 10 to 50 kGy (1 to 5 Mrad).

A source for the electron beam is not particularly limited, and may be an electron beam accelerator that may be of various types, such as a Cockroft-Walton type, a Van de Graft type, a resonance transformer type, an insulating core transformer type, a linear type, a Dynamitron type, and a high frequency type.

When ultraviolet rays are used as the ionizing radiation, a radiation including ultraviolet rays having a wavelength of 190 to 380 nm is emitted. A source for the ultraviolet rays is not particularly limited, and may be, for example, a high-pressure mercury lamp, low-pressure mercury lamp, metal halide lamp, or carbon arc lamp.

Various additives may be added to the thus formed cured resin layer to give various functions thereto, examples thereof including the so-called hard coating function which has scratch resistance based on high hardness, a de-fogging coating function, an antifouling coating function, an antiglare coating function, an antireflective coating function, an ultraviolet shielding coating function, and an infrared shielding coating function.

In the present invention, it is preferred that the surface protective layer 16 has a thickness of 1 to 1000 μm after cured. When the surface protective layer 16 has a thickness of 1 μm or more after cured, the surface protective layer can gain scratch resistance, weather resistance and other physical properties sufficient for a protective layer. When the surface protective layer 16 has a thickness of 1000 μm or less after cured, the ionizing radiation is uniformly emitted with ease so that the layer is uniformly cured with ease. This is also economically favorable.

When the surface protective layer 16 is adjusted to have a thickness ranging preferably from 1 to 50 μm, more preferably from 1 to 30 μm after cured, the decorative sheet is improved in three-dimensional moldability to gain a high performance of following a complicated three-dimensional shape, such as a shape for a vehicle interior. Consequently, the decorative sheet of the present invention can exhibit an excellent three-dimensional moldability even when a hard ionizing radiation curable resin is blended into the surface protective layer. Thus, the painted film can be made hard without damaging the three-dimensional moldability, so that the surface protective layer can have an excellent scratch resistance favorable for working or practicability.

Even when the surface protective layer 16 is made larger in thickness than conventional surface protective layers, the decorative sheet of the present invention can gain a sufficiently high three-dimensional moldability; thus, the sheet is also useful as a decorative sheet for a member having a surface protective layer required to have a particularly high film thickness, for example, for a vehicle exterior member.

As illustrated in FIG. 3, in the present invention, a surface protective layer 26 may be made of a cured product of an ionizing radiation curable resin composition containing synthetic resin particles 27 and an ionizing radiation curable resin.

In this embodiment, the synthetic resin particles 27 are blended as a deglossing agent into the surface protective layer 26 obtained by curing the ionizing radiation curable resin composition. Thus, this embodiment makes it possible to restrain the scratch resistance by elasticity that the synthetic resin particles have, and a gloss-change based on thermal pressure before and after the injection molding. Moreover, a low-gloss pattern layer (patterned ink layer) is laid which expresses a low-luster region by an interaction with the surface protective layer; thus, by a synergetic effect of this low-gloss pattern layer (patterned ink layer) and the synthetic resin particles in the surface protective layer, the low gloss can be made even lower while the gloss-change based on thermal pressure is restrained before and after the injection molding. FIG. 3 is a view of a state before the surface protective layer and a second picture layer interact with each other to express a low-luster region, that is, before the low-gloss pattern layer (patterned ink layer) is formed.

Examples of the synthetic resin particles 27 include urethane beads, silicone beads, nylon beads, and acrylic beads. Of these species, urethane beads and silicone beads are more preferred, and urethane beads are even more preferred.

About these synthetic resin particles, a single species thereof may be used alone, or two or more species thereof may be used together.

The particle diameter of the synthetic resin particles used in the present invention is preferably from 1 to 25 μm, more preferably from 1 to 10 μm, even more preferably from 1 to 5 μm to improve the design property based on deglossing effectively.

In the present invention, the particle diameter denotes a value obtained in a spray type dry measuring manner of: utilizing a Shimadzu laser-diffraction-type particle size distribution meter SALD-2100-WJA1 to spray a powder to be measured from its nozzle by use of compressed air, thereby dispersing the powder in the air; and then making a measurement.

The specific gravity of the synthetic resin particles is preferably from 0.7 to 1.5 $g/cm^3$, more preferably from 0.8 to 1.2 $g/cm^3$, even more preferably from 0.85 to 1.15 $g/cm^3$ to cause the synthetic resin particles to be present in the front surface layer of the surface protective layer and cause this layer to ensure a sufficient elasticity.

The blend amount of the synthetic resin particles is preferably from 1 to 50 parts by mass, more preferably from 5 to 45 parts by mass, even more preferably from 5 to 40 parts by mass for 100 parts by mass of the ionizing radiation curable resin to attain deglossing effectively and improve the decorative sheet in three-dimensional moldability and design property.

In the present invention, the synthetic resin particles may partially project from the front surface of the surface protective layer, and may be buried inside the surface protective layer. When the synthetic resin particles partially project from the surface protective layer, the deglossing effect is improved.

<<Low-Gloss Pattern Layer (Patterned Ink Layer)>>

The low-gloss pattern layer 17 which has the low-luster region, is a layer formed by an interaction, such as partial elution-out, dispersion or mixing, between the thermoplastic resin that is a binder resin of the ink forming the second picture layer 15, and the ionizing radiation curable resin forming the surface protective layer 16. This layer is a layer formed just above the second picture layer 15 inside the surface protective layer 16. In the decorative sheet of the present invention, by the presence of the low-gloss pattern layer 17 formed just above the second picture layer 15, a gloss-difference is generated between the region where the low-gloss pattern layer 17 is not present and that where the layer is present. By this matter, the region where the low-gloss pattern layer 17 is present is visually recognized as concave portions so that an unevenness feeling is exhibited.

The decorative sheet of the present invention can gain the unevenness feeling by the matter that the sheet has a gloss-difference between the region where the second picture layer 15 is formed and the surface protective layer 16 covering this region (hereinafter referred to as the "second-picture-layer-formed-region/surface-protective-layer"), and the region where the second picture layer 15 is not formed and the surface protective layer 16 covering this region (hereinafter referred to as the "second-picture-layer-non-formed-region/surface-protective-layer"), that is, a difference of degree of luster. Thus, the sheet gains excellent design property.

In order to use various differences of degree of luster according to the kind of design expression to produce decorative sheets good in design property, the degree of luster (gloss value) of the second-picture-layer-formed-region/surface-protective-layer is preferably 20 or less since the design property is made better. More preferably, the difference of degree of luster is 10 or more between the second-picture-layer-formed-region/surface-protective-layer and the second-picture-layer-non-formed-region/surface-protective-layer since the design property can be made even better. However, the degree of luster and the difference of degree of luster are not limited to the above.

[Decorative Resin Molded Article]

The decorative resin molded article of the present invention is a decorative resin molded article having at least an injected resin layer, a base film layer, a low-gloss pattern layer (patterned ink layer), and a surface protective layer in this order; the low-gloss pattern layer being a layer which expresses a low-luster region by an interaction with the surface protective layer; and the surface protective layer comprising a cured product of an ionizing radiation curable resin composition. This article is preferably produced using the decorative sheet of the invention. Furthermore, in the invention, the surface protective layer is more preferably made of a cured product of an ionizing radiation curable resin composition containing synthetic resin particles.

More specifically, the decorative resin molded article of the invention is preferably produced by an injection molding method that may be of various types, such as an insert molding method, injection molding simultaneous decorating method, blow molding method, or gas injection molding method, preferably an insert molding method or injection molding simultaneous decorating method, using the decorative sheet of the invention.

In the insert molding method, using a mold for vacuum molding, the decorative sheet of the invention is beforehand subjected to vacuum molding (off-line pre-molding) in a vacuum molding step, so as to be shaped into the form of a molded article surface. Next, extra portions thereof are trimmed if necessary to yield a shaped sheet. This shaped sheet is inserted into an injection mold, and parts of the injection mold are fastened with each other. A resin in a flowing state is injected into the mold, and solidified to attain injection molding and simultaneously integrate the external surface of the resin molded article with the decorative sheet. In this way, a decorative resin molded article is produced.

The injected resin may be a resin corresponding to the usage of the article. The resin is typically a thermoplastic resin, examples thereof include polyolefin resins such as polyethylene and polypropylene, ABS resin, styrene resin, polycarbonate resin, acrylic resin, and vinyl chloride resin. The injected resin may be a thermosetting resin such as urethane resin or epoxy resin in accordance with the usage.

In the injection molding simultaneous decorating method, the decorative sheet of the present invention is arranged into a female mold functioning also as a mold for vacuum molding, and having a suction hole made for injection molding. Using this female mold, the decorative sheet is subjected to pre-molding (in-line pre-molding). Thereafter, injection mold parts (including the female mold) are fastened with each other. A resin in a flowing state is then injected and filled into the mold parts, and solidified to attain injection molding and simultaneously integrate the external surface of the resin molded article with the decorative sheet. In this way, a decorative resin molded article is produced.

In the injection molding simultaneous decorating method, the decorative sheet receives thermal pressure based on the injected resin; thus, when the decorative sheet is close to a flat sheet so as to be hardly narrowed, the decorative sheet may be or may not be preheated.

The injected resin used in this method may be the same as described about the insert molding method.

About the decorative resin molded article produced as described above, its surface protective layer is not cracked in a molding process of the article. Thus, the molded article is good in three-dimensional moldability. The outer surface thereof is high not only in scratch resistance but also in solvent resistance and chemical resistance. Furthermore, in the production method of the present invention, at the stage of producing a decorative sheet therefor, its surface protective layer is completely cured. It is therefore unnecessary to use the step of crosslinking and curing the surface protective layer after the production of the decorative resin molded article.

EXAMPLES

The following will describe the present invention in more detail by way of working examples thereof. However, the invention is never limited by the examples.

Examples 1 to 7, and Comparative Examples 1 to 3

Evaluating Methods
(1) Three-Dimensional Moldability (Vacuum Molding)

A decorative sheet obtained in each of the Examples and the Comparative Examples was vacuum-molded by a method described below. After the molding, the external appearance thereof was evaluated. The criterion of the evaluation is as follows:

⊙: In the surface protective layer, painted-film cracking and whitening were not observed at all, and the sheet satisfactorily followed the shape of the mold.

○: In one or more portions of the three-dimensionally shaped region or the maximum extended region, fine painted-film cracking or whitening was observed, but no practical problem was caused.

Δ: In one or more portions of the three-dimensionally shaped region or the maximum extended region, minor painted-film cracking or whitening was generated.

x: The sheet was unable to follow the shape of the mold so that painted-film cracking or whitening was observed in the surface protective layer.

<Vacuum Molding>

The decorative sheet is heated to 160° C. with an infrared heater to be softened. Next, a mold for vacuum molding is used to vacuum-mold the sheet (maximum draw ratio:

100%), thereby fashioning the sheet into the internal shape of the mold. The resultant decorative sheet is cooled, and then released from the mold.

(2) Scratch Resistance

A #0000 steel wool was used, and reciprocated 5 times onto the decorative sheet obtained in each of the Examples and the Comparative Examples under a load of 1.5 kgf. The external appearance of the test sheet was then evaluated. The criterion of the evaluation is as follows:

⊙: No scratch mark was observed.

○: In the front surface, fine scratches were observed, but neither painted-film scraping nor whitening was observed.

Δ: In the front surface, minor scratches were observed.

x: In the front surface, considerable scratches were observed.

(3) Chemical Resistance

An insect repellent spray (10% solution of DEET (N,N-diethyl-m-toluamide)) was applied in an amount of 0.05 g onto an extent, 10 cm×10 cm in area, of the decorative sheet obtained in each of the Examples and the Comparative Examples, and then the sheet was allowed to stand still at room temperature (23° C.) for 30 minutes. Next, the spray-applied extent was washed with a neutral detergent, and the external appearance of this extent was evaluated. The criterion of the evaluation is as follows:

⊙: The external appearance was not changed at all.

○: In the front surface, very minor whitening or swelling was observed.

Δ: In the front surface, whitening, swelling and dissolution were observed, but no practical problem was caused.

x: In the front surface, considerable whitening, swelling and dissolution were observed.

(4) Design Property

An evaluation was made about the design property of the decorative sheet obtained in each of the Examples and the Comparative Examples in accordance with the following evaluating criterion:

⊙: The capillary tube region was low in gloss but the non-capillary-tube region was not low in gloss, so that a visually excellent unevenness feeling was exhibited. Texture of woodgrains was also obtained. Thus, the design property was very high.

○: The capillary tube region was low in gloss so that a visual unevenness feeling was exhibited and the region was recognized as concave portions. Thus, the design property was high.

Δ: The capillary tube region was slightly low in gloss so that a slight visual unevenness feeling was exhibited and the region was recognized as concave portions. About the design property, practical problems were not substantially caused.

x: A two-dimensional texture was obtained so that the decorative sheet was poor in design property.

(5) Molecular Weight Measurement

A high-speed GPC instrument manufactured by Tosoh Corporation was used. The molecular weight of each of the decorative sheets was measured using a column (trade name: "TSKgel αM") manufactured by Tosoh Corporation and using, as a solvent, N-methyl-2-pyrrolidinone (NMP) at a column temperature of 40° C. and a flow rate of 0.5 cc/min. Any weight-average molecular weight in the present invention is a value in terms of that of polystyrene.

Example 1

As a printing film, an ABS resin film (hereinafter referred to as "ABS"; bend elastic constant: 1,800 MPa; thickness: 400 μm) was used. A printing ink made of a vinyl chloride/vinyl acetate copolymer resin composition was used to form a first picture layer having a woodgrain pattern on a surface of the film by gravure printing.

Into 100 parts by mass of an acrylic resin printing ink (weight-average molecular weight: 100,000) was blended silica (average particle diameter: 5 μm; oil absorption: 200 mL/100-g) to give a P/V ratio of 1.0, thereby obtaining a second picture ink A. This ink A was painted onto the first picture layer by gravure printing to cause the painted ink A to go along with the capillary tube region of the woodgrain pattern of the first picture layer. In this way, a second picture layer 1 μm in thickness was obtained. Next, an ionizing radiation curable resin composition (hereinafter referred to as "EB1") having a composition described below was painted onto the second picture layer to give a thickness of 3 μm after the composition would be cured. This uncured resin layer was irradiated with an electron beam at an acceleration voltage of 165 kV and an irradiation dose of 50 kGy (5 Mrad) to cure the ionizing radiation curable resin composition. In this way, a surface protective layer was formed to yield a decorative sheet. The resultant decorative sheet was evaluated by the above-mentioned methods. The evaluation results are shown in Table 1.

"Ionizing Radiation Curable Resin Composition (EB1)"

Polycarbonate acrylate (bifunctional; weight-average molecular weight: 10,000): 80 parts by mass Urethane acrylate oligomer (hexafunctional; weight-average molecular weight: 6,000): 20 parts by mass Silica (silica having individual surfaces made hydrophobic by silane coupling; average particle diameter: 5 μm): 10 parts by mass Olefin wax (polypropylene wax; average particle diameter: 5 μm): 5 parts by mass Example 2 and Comparative Examples 1 to 3

Each decorative sheet was yielded in the same way as in Example 1 except that an ionizing radiation curable resin composition shown in Table 1 was used in Example 1. The resultant decorative sheet was evaluated by the above-mentioned methods.

Example 3

A decorative sheet was yielded in the same way as in Example 1 except that after the first picture layer was laid and before the second picture layer was laid in Example 1, a primer composition (hereinafter referred to as "P1") was painted onto the first picture layer by gravure reverse coating to give a thickness of 2 μm, thereby forming a primer layer. The primer composition contained an acrylpolyol and hexamethylene diisocyanate (hexamethylene diisocyanate was blended to give an NCO equivalent equal to the OH equivalent of the acrylpolyol). The resultant decorative sheet was evaluated by the above-mentioned methods.

Examples 4 and 5

Each decorative sheet was yielded in the same way as in Example 3 except that the primer composition, the second picture ink and the ionizing radiation curable resin composition in Example 3 were changed as shown in Table 1. The resultant decorative sheet was evaluated by the above-mentioned methods.

Example 6

A decorative sheet was yielded in the same way as in Example 3 except that after the first picture layer was laid and before the primer layer was laid in Example 3, a transparent resin film layer was laid (which was an acrylic resin film that is to be referred to as "acryl" hereinafter; thickness: 100 μm; tensile elasticity: 1500 MPa). The resultant decorative sheet was evaluated by the above-mentioned methods.

Example 7

A decorative sheet was yielded in the same way as in Example 7 except that the resin film used for the transparent resin film layer in Example 7 was changed to a polyethylene terephthalate film (that was subjected to double-surface corona treatment, and is to be referred to as "PET" hereinafter; thickness: 100 μm). The resultant decorative sheet was evaluated by the above-mentioned methods.

TABLE 1

|  | Examples | | | | | | | Comparative Examples | | |
| --- | --- | --- | --- | --- | --- | --- | --- | --- | --- | --- |
|  | 1 | 2 | 3 | 4 | 5 | 6 | 7 | 1 | 2 | 3 |
| Base film layer | ABS | ABS | ABS | ABS | ABS | ABS | ABS | ABS | ABS | ABS |
| Transparent resin film layer | — | — | — | — | — | Acrylic resin | PET | — | — | — |
| Primer layer | — | — | P1 | P1 | P1 | P1 | P1 | — | — | — |
| Second picture ink | A | A | A | A | B | A | A | A | A | A |
| Ionizing radiation curable resin composition | EB1 | EB2 | EB1 | EB2 | EB1 | EB1 | EB1 | EB3 | EB4 | EB5 |
| Three-dimensional moldability | ⊙ | ○ | ⊙ | ○ | ⊙ | ○ | ○ | ○ | ○ | X |
| Scratch resistance | ⊙ | ○ | ⊙ | ○ | ⊙ | ○ | ○ | X | X | ⊙ |
| Chemical resistance | Δ | ○ | ○ | ⊙ | ○ | ○ | ⊙ | X | X | ○ |
| Design property | ○ | ○ | ⊙ | ⊙ | ⊙ | ⊙ | ⊙ | ○ | ○ | ○ |

[Notes]
"Second Picture Ink B"

Ink containing a nitrocellulose resin and silica (oil absorption: 200 mL/100-g; average particle diameter: 5 μm) (P/V ratio: 1.0)

"EB2"

Mixture of 70 parts by mass of an acrylsilicone acrylate (weight-average molecular weight: 20,000; molecular weight between its crosslinking points after the acrylate was cured: 200) and 30 parts by mass of a urethane acrylate oligomer (hexafunctional; weight-average molecular weight: 5,000) (total resin amount: 100 parts by mass)

Silica (silica having individual surfaces made hydrophobic by silane coupling; average particle diameter: 5 μm): 10 parts by mass Olefin wax (polypropylene wax; average particle diameter: 5 μm): 5 parts by mass

"EB3"

Mixture of 30 parts by mass of a urethane acrylate (trifunctional; weight-average molecular weight: 10,000) and 70 parts by mass of a thermoplastic acrylic resin (polymethyl methacrylate; weight-average molecular weight: 70,000) (total resin amount: 100 parts by mass)

Silica (silica having individual surfaces made hydrophobic by silane coupling; average particle diameter: 5 μm): 10 parts by mass Olefin wax (polypropylene wax; average particle diameter: 5 μm): 5 parts by mass

"EB4"

Urethane acrylate (bifunctional; weight-average molecular weight: 50,000): 100 parts by mass

"EB5"

Urethane acrylate (hexafunctional; weight-average molecular weight: 3,000): 100 parts by mass Silica (silica having individual surfaces made hydrophobic by silane coupling; average particle diameter: 5 μm): 10 parts by mass Olefin wax (polypropylene wax; average particle diameter: 5 μm): 5 parts by mass It has been verified that: the decorative sheet of the present invention is not cracked nor broken in an ordinary insert molding method or injection molding simultaneous decorating method even under conditions of a rapid temperature drop from a heating temperature of about 160° C. to a temperature at which the sheet is brought into contact with a mold, and a rapid extending speed and a high elongation degree thereof; thus, the sheet is good in three-dimensional moldability; and the outer surface of a decorative resin molded article produced therefrom has an excellent scratch resistance and excellent chemical resistance. It has also been verified that: in the decorative sheet of the invention, a low-gloss pattern layer is present which has a low-luster region recognized visually as concave portions by an interaction between the thermoplastic resin of the second picture ink and the ionizing radiation curable resin of the surface protective layer; and the decorative sheet has a design property excellent in texture.

Examples 8 to 19, and Comparative Examples 4 and 5

Evaluating Methods
(I) Three-Dimensional Moldability (Vacuum Molding)

A decorative sheet obtained in each of the Examples and the Comparative Examples was vacuum-molded by a method described below. After the molding, the external appearance thereof was evaluated. The criterion of the evaluation is as follows:

⊙: In the surface protective layer, painted-film cracking and whitening were not observed at all, and the sheet satisfactorily followed the shape of the mold.

○: In one or more portions of the three-dimensionally shaped region or the maximum extended region, fine painted-film cracking or whitening was observed, but no practical problem was caused.

Δ: The sheet was unable to follow the shape of the mold so that painted-film cracking or whitening was observed in the surface protective layer.

x: The sheet was unable to follow the shape of the mold so that considerable painted-film cracking or whitening was observed in the surface protective layer.

<Vacuum Molding>

The decorative sheet is heated to 160° C. with an infrared heater to be softened. Next, a mold for vacuum molding is used to vacuum-mold the sheet (maximum draw ratio: 150%), thereby fashioning the sheet into the internal shape of the mold. The resultant decorative sheet is cooled, and then released from the mold.

(II) Scratch Resistance A

One's nail was reciprocated 20 times onto the test piece so that the test piece was scratched. The external appearance of the test piece was then evaluated. The criterion of the evaluation is as follows:

⊙: No scratch mark was observed.

◯: In the front surface, fine scratches were observed, but neither painted-film scraping nor whitening was observed.

Δ: In the front surface, scratches were observed, and the disappearance of gloss was observed in the scratched portions.

x: In the front surface, considerable scratches were observed, and the painted film was scraped off.

(III) Scratch Resistance B

A #0000 steel wool was used, and reciprocated 5 times onto the decorative sheet obtained in each of the Examples and the Comparative Examples under a load of 1.5 kgf. The external appearance of the test sheet was then evaluated. The criterion of the evaluation is as follows:

⊙: No scratch mark was observed.

◯: In the front surface, fine scratches were observed, but neither painted-film scraping nor whitening was observed.

Δ: In the front surface, scratches were observed, so that the surface was whitened.

x: In the front surface, considerable scratches were observed, and the painted film was scraped off.

(IV) Gloss Change

A measurement was made about a change in the gloss of the front surface of each of the decorative sheets before and after the injection molding (a gloss meter was used to measure the 60° gloss value thereof according to JIS K 7105). The criterion of the evaluation is as follows:

⊙: The change in the gloss value was 0 or more and less than 3.

◯: The change in the gloss value was 3 or more and less than 5.

Δ: The change in the gloss value was 5 or more and less than 10.

x: The change in the gloss value was 10 or more.

(V) Design Property (Gemini Effect)

The design property of the front surface of each of the decorative sheets was evaluated with the naked eye.

⊙: The capillary tube region was recognized as concave portions, and further a woodgrain texture was obtained. Thus, the design property was very high.

◯: The capillary tube region was recognized as concave portions. Thus, the design property was high.

Δ: The capillary tube region was slightly recognized as concave portions. Thus, the design property was low.

x: A two-dimensional design was obtained so that the design property was poor.

(VI) Molecular Weight Measurement

The molecular weight of each of the decorative sheets was measured by the same molecular-weight-measuring method as that in Examples 1 to 7 and Comparative Examples 1 to 3.

Example 8

As a base film layer, a colored ABS resin film 400 μm in thickness was used. A printing ink made of a vinyl chloride/vinyl acetate copolymer resin composition was used to form a picture layer having a woodgrain pattern on this film by gravure printing. A patterning ink A that will be detailed later was used to form onto the picture layer a second picture layer (film thickness: 1.0 μm) constituting a patterned ink layer by gravure printing to cause the printed ink A to go along with the capillary tube region of the woodgrains.

An ionizing radiation curable resin composition (EB1) containing synthetic resin particles shown in Table 2 was painted onto the second picture layer constituting the patterned ink layer to give a thickness of 3 μm after the resin region thereof would be cured. This uncured resin composition layer was irradiated with an electron beam at an acceleration voltage of 165 kV and an irradiation dose of 50 kGy (5 Mrad) to cure the ionizing radiation curable resin. In this way, a decorative sheet was yielded.

Examples 9 to 17, and Comparative Examples 4 and 5

As a base film layer, a colored ABS resin film 400 μm in thickness was used. A printing ink made of a vinyl chloride/vinyl acetate copolymer resin composition was used to form a picture layer having a woodgrain pattern on this film by gravure printing. A primer was painted onto this picture layer by gravure reverse coating to give a thickness of 2 μm. A patterning ink described in Table 2 was used to form onto the primer layer a second picture layer (film thickness: 1.0 μm) constituting a patterned ink layer by gravure printing to cause this printed ink to go along with the capillary tube region of the woodgrains.

One out of compositions obtained by varying synthetic resin particles or inorganic particles, and an ionizing radiation curable resin in accordance with respective formulations shown in Table 2 was painted onto the second picture layer constituting the patterned ink layer to give a thickness of 3 μm after the resin region thereof would be cured. This uncured resin composition layer was irradiated with an electron beam at an acceleration voltage of 165 kV and an irradiation dose of 50 kGy (5 Mrad) to cure the ionizing radiation curable resin composition. In this way, each decorative sheet was yielded.

Examples 18 and 19

A transparent acrylic film 100 μm in thickness was used (in Example 19, a PET film subjected to double-surface corona treatment was used). A printing ink made of a vinyl chloride/vinyl acetate copolymer resin composition was used to form a picture layer having a woodgrain pattern on this film by gravure printing. Next, by gravure reverse coating, a primer layer 2 μm in thickness was applied onto the front surface on which the picture layer was not laid. A patterning ink described in Table 2 was used to form onto the primer layer a second picture layer (film thickness: 1.0 μm) constituting a patterned ink layer by gravure printing to cause this printed ink to go along with the capillary tube region of the woodgrains.

One out of compositions obtained by varying synthetic resin particles and an ionizing radiation curable resin composition (EB1) in accordance with respective formulations shown in Table 2 was painted onto the second picture layer constituting the patterned ink layer to give a thickness of 3 μm after the resin region thereof would be cured. This uncured resin composition layer was irradiated with an electron beam at an acceleration voltage of 165 kV and an irradiation dose of 50 kGy (5 Mrad) to cure the electron beam curable resin composition. By gravure reverse coating, an adhesive made of a polyester resin was painted onto the surface of the acrylic film on which the picture layer having the woodgrain pattern was laid, so as to give a thickness of 10 μm. This workpiece and a colored ABS resin film 400 μm in thickness were dry-laminated onto each other to yield a decorative sheet.

Hexafunctional urethane acrylate oligomer: 30 parts by mass
  (weight-average molecular weight: 5,000)
Polyolefin wax: 6 parts by mass
"EB2-4"
Bifunctional urethane acrylate: 40 parts by mass
  (weight-average molecular weight: 2,000)

TABLE 2

| | | | Examples | | | | | | |
|---|---|---|---|---|---|---|---|---|---|
| | | | 8 | 9 | 10 | 11 | 12 | 13 | 14 |
| Layer structure | Surface protective layer | | EB2-1 | EB2-1 | EB2-2 | EB2-3 | EB2-1 | EB2-1 | EB2-1 |
| | Synthetic resin particles | Kind | Urethane resin | Urethane resin | Urethane resin | Urethane resin | Urethane resin | Silicone resin | Acrylic resin |
| | | Particle diameter (μm) | 3.5 | 3.5 | 3.5 | 3.5 | 6 | 3 | 3 |
| | | Addition amount (parts by mass)*1 | 13 | 13 | 13 | 13 | 13 | 13 | 13 |
| | Patterning ink | | A | A | A | A | A | A | A |
| | Primer layer | | Not laid | Laid | Laid | Laid | Laid | Laid | Laid |
| | Transparent resin film layer | | — | — | — | — | — | — | — |
| | Base film layer | | ABS | ABS | ABS | ABS | ABS | ABS | ABS |
| Evaluation | Three-dimensional moldability | | ⊙ | ○ | ⊙ | ○ | △ | △ | △ |
| | Scratch resistance A | | △ | ⊙ | ○ | ○ | ○ | △ | △ |
| | Scratch resistance B | | ○ | ⊙ | ⊙ | ○ | ○ | △ | △ |
| | Gloss change | | ⊙ | ⊙ | ⊙ | ⊙ | ○ | △ | △ |
| | Design property | | ○ | ⊙ | ○ | ○ | △ | ⊙ | ○ |

| | | | Examples | | | | | Comparative Examples | |
|---|---|---|---|---|---|---|---|---|---|
| | | | 15 | 16 | 17 | 18 | 19 | 4 | 5 |
| Layer structure | Surface protective layer | | EB2-1 | EB2-1 | EB2-1 | EB2-1 | EB2-1 | EB2-1 | EB2-4 |
| | Synthetic resin particles | Kind | Urethane resin | Urethane resin | Urethane resin | Urethane resin | Urethane resin | Silica | Silica |
| | | Particle diameter (μm) | 3.5 | 3.5 | 3.5 | 3.5 | 3.5 | 5 | 5 |
| | | Addition amount (parts by mass)*1 | 40 | 13 | 13 | 13 | 13 | 10 | 10 |
| | Patterning ink | | A | B | C | A | A | A | A |
| | Primer layer | | Laid | Laid | Laid | Laid | Laid | Laid | Laid |
| | Transparent resin film layer | | — | — | — | Acrylic resin | PET | — | — |
| | Base film layer | | ABS | ABS | ABS | ABS | ABS | ABS | ABS |
| Evaluation | Three-dimensional moldability | | △ | ○ | ○ | ○ | △ | X | X |
| | Scratch resistance A | | △ | ⊙ | ⊙ | ⊙ | ⊙ | X | X |
| | Scratch resistance B | | ○ | ⊙ | ⊙ | ⊙ | ⊙ | △ | X |
| | Gloss change | | ○ | ⊙ | ⊙ | ⊙ | ⊙ | X | X |
| | Design property | | △ | ⊙ | ○ | ○ | ○ | ○ | X |

*1 Addition amount relative to 100 parts by mass of ionizing radiation curable resin

[Notes]
"EB2-1"
  Bifunctional polycarbonate acrylate: 94 parts by mass
  (weight-average molecular weight: 10,000)
  Hexafunctional urethane acrylate oligomer: 6 parts by mass
  (weight-average molecular weight: 6,000)
  Polyolefin wax: 6 parts by mass
"EB2-2"
  Bifunctional polycarbonate acrylate: 100 parts by mass
  (weight-average molecular weight: 10,000)
  Polyolefin wax: 6 parts by mass
"EB2-3"
  Acrylsilicone acrylate: 70 parts by mass
  (weight-average molecular weight: 20,000)
  (molecular weight between its crosslinking points after the acrylate was cured: 200)
  Bifunctional polyester acrylate: 60 parts by mass
  (weight-average molecular weight: 10,000)
  Polyolefin wax: 6 parts by mass
"Patterning Ink A"
  Acrylic resin (weight-average molecular weight: 100,000): 100 parts by mass
  Silica (oil absorption: 200 mL/100-g; average particle diameter: 5 μm): 100 parts by mass
"Patterning Ink B"
  Nitrocellulose resin: 100 parts by mass
  Silica (oil absorption: 200 mL/100-g; average particle diameter: 5 μm): 100 parts by mass
"Patterning Ink C"
  Polyester urethane resin (number-average molecular weight: 3,000): 100 parts by mass
  Silica (average particle diameter: 1.5 μm): 10 parts by mass
"Primer"
  Hexamethylene diisocyanate was mixed with an acrylpolyol to make its NCOs equivalent thereto.

In the decorative sheet of the present invention, synthetic resin particles are blended into its surface protective layer; thus, the sheet is excellent in scratch resistance and can be further restrained from being changed in gloss. Moreover, in an ordinary insert molding method or injection molding simultaneous decorating method, the decorative sheet of the invention is neither cracked nor broken even under conditions of a rapid temperature drop from a heating temperature of about 160° C. to a temperature at which the sheet is brought into contact with a mold, and a rapid extending speed and a high elongation degree thereof; thus, the sheet is good in three-dimensional moldability.

INDUSTRIAL APPLICABILITY

The decorative sheet of the present invention is usable for various decorative resin molded articles. For example, the sheet is suitably used for decorative resin molded articles for interior members or exterior members for vehicles such as automobiles, furnishing members such as baseboards and verandas, fittings such as window frames and door frames, building interior members such as walls, floors and ceilings, and housings and containers of household electric appliances such as televisions and air conditioners.

DESCRIPTION OF REFERENCE SIGNS

10 and 21: Decorative sheets
11 and 22: Base film layers
12 and 23: First picture layers
13: Transparent resin film layer
14 and 24: Primer layers
15 and 25: Second picture layers
16 and 26: Surface protective layers
17: Low-gloss pattern layer (patterned ink layer)
18: Convex shapes
27: Synthetic resin particles

The invention claimed is:

1. A decorative resin molded article, having at least an injected resin layer, a base film layer, a low-gloss pattern layer, and a surface protective layer in this order; the low-gloss pattern layer being a layer which expresses a low-luster region by an interaction with the surface protective layer; and the surface protective layer comprising urethane beads and a cured product of an ionizing radiation curable resin composition, wherein the cured product is obtained by curing the ionizing radiation curable resin composition comprising, as one or more ionizing radiation curable resins, a polycarbonate (meth)acrylate and/or acryl-silicone (meth)acrylate.

* * * * *